(12) United States Patent
Hosoi (10) Patent No.: US 8,571,274 B2
(45) Date of Patent: Oct. 29, 2013

(54) PERSON-JUDGING DEVICE, METHOD, AND PROGRAM

(75) Inventor: Toshinori Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 118 days.

(21) Appl. No.: 13/141,446

(22) PCT Filed: Dec. 14, 2009

(86) PCT No.: PCT/JP2009/070822
§ 371 (c)(1),
(2), (4) Date: Jun. 22, 2011

(87) PCT Pub. No.: WO2010/073929
PCT Pub. Date: Jul. 1, 2010

(65) Prior Publication Data
US 2011/0268321 A1 Nov. 3, 2011

(30) Foreign Application Priority Data
Dec. 22, 2008 (JP) .................................. 2008-325447

(51) Int. Cl.
*G06K 9/00* (2006.01)

(52) U.S. Cl.
USPC ............................. 382/118; 382/103; 382/190

(58) Field of Classification Search
USPC .......... 382/103, 118, 190, 209, 218, 224, 305
See application file for complete search history.

(56) References Cited

U.S. PATENT DOCUMENTS

| 7,079,669 B2 | 7/2006 | Hashimoto |
| 7,450,737 B2 | 11/2008 | Ishikawa et al. |

(Continued)

FOREIGN PATENT DOCUMENTS

| CN | 101162524 A | 4/2008 |
| JP | 2003-132340 A | 5/2003 |
| JP | 2005-165923 A | 6/2005 |
| JP | 2007-156939 A | 6/2007 |
| JP | 2007-164720 A | 6/2007 |
| JP | 2007-187618 A | 7/2007 |

(Continued)

OTHER PUBLICATIONS

Grange, et al. "Robust real-time 3D detection of obstructed head and hands in indoors environments", Journal of multimedia, Jul. 2006, pp. 29-36.*

(Continued)

*Primary Examiner* — Daniel Mariam
(74) *Attorney, Agent, or Firm* — McGinn IP Law Group, PLLC (57) ABSTRACT

A person-judging device comprises: an obstruction storage which stores information indicating an area of an obstruction which is extracted from an image based on a video signal from an external camera, the obstruction being extracted from the image; head portion range calculation means which, when a portion of an object which is extracted from the image is hidden by the obstruction, assumes that a potential range of grounding points where the object touches a reference face on the image is the area of the obstruction which is stored in the obstruction storage, and which, based on the assumed range and the correlation between the height of a person and the size and position of the head portion that are previously provided, calculates the potential range of the head portion on the image by assuming that a portion farthest from the grounding points of the object is the head portion of the person; and head portion detection means that judges whether an area including a shape corresponding to the head portion exists in the calculated range of the head portion.

7 Claims, 3 Drawing Sheets

(56) References Cited

U.S. PATENT DOCUMENTS

| | | | |
|---|---|---|---|
| 7,720,285 | B2 | 5/2010 | Ishikawa |
| 7,840,036 | B2 | 11/2010 | Higaki |
| 8,144,238 | B2 | 3/2012 | Kotake |
| 8,208,028 | B2 | 6/2012 | Yamazaki |
| 8,228,382 | B2 * | 7/2012 | Pattikonda .................... 348/169 |
| 2007/0165967 | A1 | 7/2007 | Ando et al. |
| 2009/0080711 | A1 | 3/2009 | Yokoi |

FOREIGN PATENT DOCUMENTS

| | | |
|---|---|---|
| JP | 2007-310805 A | 11/2007 |
| JP | 2008-47991 A | 2/2008 |
| JP | 2008-241707 A | 10/2008 |
| JP | 2009-75868 A | 4/2009 |
| WO | WO 02/056251 A1 | 7/2002 |
| WO | WO 2008/018423 A1 | 2/2008 |

OTHER PUBLICATIONS

Paul Viola, Michael Jones, "Rapid object detection using a boosted cascade of simple features", Proceeding of Computer Vision and Pattern Recognition 2001.

Collins, Lipton, Kanade, Fujiyoshi, Duggins, Tsin, Tolliver, Enomoto, and Hasegawa, "A System for Video Surveillance and Monitoring: VSAM Final Report", Technical report CMU-RI-TR-00-12, Robotics Institute, Carnegie Mellon University, May 2000.

Toshinori Hosoi, Eiki Ishidera, "An object classification method based on moving region's appearance", FIT2006 Lecture Notes, 2006.

'R. Y. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, pp. 323-344, 1987'.

Atsushi Sato, et al., "Character Recognition using Generalized Learning Vector Quantization", Technical Report of the Institute of Electronics, Information and Communication Engineers (IEICE), PRMU95-219, 1996.

Yuzo Ogawa, et al., "Visual Tracking System by Master-Slaving", The ninth Symposium on Sensing via Image Information, 2003) (see formulae (8) and (9)).

Chinese Office Action dated Nov. 30, 2012, with partial English translation.

Chinese Office Action dated Jul. 31, 2013, and Search Report with English translations.

* cited by examiner

PERSON-JUDGING DEVICE, METHOD, AND PROGRAM

TECHNICAL FIELD

The present invention relates to a technique for judging whether an object appearing in an image based on a video signal from an external camera is a person or not.

BACKGROUND ART

Non Patent Literature 1 discloses a method for enabling judgment of whether an object appearing in an image is a person or not. In that judging method, a process of judging whether an object is a face or not is repeatedly performed on an entire image to detect a face in the image. It can judge whether or not an object in an image is a person by setting a human body to instead of a face as the detection target.

Non Patent Literature 2 discloses another method for enabling judgment of whether or not an object appearing in an image is a person. In that judging method, a process for evaluating the difference between an image that was taken at a certain time (background image) and a current image, using a small amount of processing, is used. The method rapidly detects a partial area that is likely to contain a moving object based on the difference, and, only in the case of an image in the partial area, judges whether the image is a 'person', an 'automobile,' or 'another object'. That is, the method reduces the number of times for performing the process that judges whether the image contains a 'person' or a 'non-person' by rapidly narrowing down an area to a partial area that is likely to contain the object.

Although the judging method described in Non Patent Literature 2 uses a relatively simple judging process by using the feature quantity which is calculated from shapes or the like obtained from the image, it can provide higher judging performance with a slightly longer processing time by being combined with a statistical image recognition technique described in Non Patent Literature 3, for example.

The technique described in Non Patent Literature 1 features rapidity, which is only distinguished when it is compared with a conventional technique for repeating a pattern recognition process. When the technique described in Non Patent Literature 1 is compared with a technique for only performing a calculation to determine the difference between images as described in Non Patent Literature 2, the latter technique for performing a calculation to determine the difference seems to require a small amount of processing.

It is easily thought that whether an object is a 'person' or a 'non-person' can be easily determined by judging whether the object 'has the head or not' on that assumption that a human body has a head portion. For example, since the face is a portion of the head, the face searching process described in Non Patent Literature 3 is virtually capable of judging whether an object is a 'person' or a 'non-person'.

In general, if the head occupies a comparatively large portion of an image, the face judging process for judging whether it is a 'face' or a 'non-face' has higher judging efficiency than the process of judging whether it is a 'person' or a 'non-person'. In addition, the face judging process is capable of providing an accurate judgment even if portions of the human body other than the face are hidden. It is easily expected that the face judging process can be speeded up to some extent if it is used in combination with a technique for rapidity detecting a partial area that is likely to contain an object as described in Non Patent Literature 1 as preprocessing.

Patent Literature 1 describes another process of judging whether an object is a 'face' or a 'non-face'. According to the method described in Patent Literature 1, in the case of an object that is captured by Laser Rader, a determination is made whether this object is a 'person' or a 'non-person' by judging whether the image of the area that contains the object 'contains a face or not'.

Patent Literature 2 discloses a technique that uses stereo vision taken by cameras to measure distances from the cameras to an object, and based on the measurements, narrows down to the size of the potential face on the image, instead of merely narrowing down the area to search a face. According to the technique, the amount of processing that is needed to search for a face can be reduced.

Patent Literature 3 describes a method for extracting a face area corresponding to the face of a person in an image, estimating the height of the face area from the floor of the center of gravity with reference to camera parameter, and from the estimated result, extracting a wheel chair area in the image.

CITATION LIST

Patent Literature
Patent Literature 1
    JP2007-187618A
Patent Literature 2
    JP2007-156939A
Patent Literature 3
    WO2002/056251 (Republication)

Non Patent Literature

Non Patent Literature 1
    Paul Viola, Michael Jones, "Rapid object detection using a boosted cascade of simple features", Proceeding of Computer Vision and Pattern Recognition 2001
Non Patent Literature 2
    Collins, Lipton, Kanade, Fujiyoshi, Duggins, Tsin, Tolliver, Enomoto, and Hasegawa, "A System for Video Surveillance and Monitoring: VSAM Final Report", Technical report CMU-RI-TR-00-12, Robotics Institute, Carnegie Mellon University, May, 2000
Non Patent Literature 3
    Toshinori Hosoi, Eiki Ishidera, "An object classification method based on moving region's appearance" FIT2006 Lecture Notes, 2006

DISCLOSURE OF INVENTION

According to the method described in Non Patent Literature 1, the judgment on whether or not an object is a face needs to be performed on all the partial areas in an image that are likely to contain objects, which requires a large amount of processing, and therefore, slows down the processing speed. For that reason, the method cannot use a low performance and low cost device for high-speed processing.

If an obstruction hides a large area that contains a person, then high judging efficiency cannot necessarily be obtained by using this method. Therefore, it is difficult to apply this method for the purpose of obtaining high judging efficiency.

According to the method described in Non Patent Literature 2, a reduction in the amount of processing can be achieved by using the difference between images, but, if an obstruction hides a large area of a person, high judging efficiency cannot necessarily be achieved. Therefore, as in the case of the method of Non Patent Literature 1, it is difficult to apply the method for the purpose of obtaining high judging efficiency.

According to the combined technique of the judging method described in Non Patent Literature 2 and the statistical image recognition technique described in Non Patent Literature 3, the judging performance can be improved with a slightly longer processing time, but, if an obstruction hides a large area of a person, it is difficult to perform the judging process. Therefore, it is difficult to apply the technique for the purpose of obtaining high judging efficiency.

Both of the methods described in Patent Literature 1 and Patent Literature 3 merely perform a process of simply searching for a face in a partial area of an image that contains an object, which requires a large amount for processing and slows down the processing speed.

If an obstruction hides a large area of an object, high judging efficiency cannot necessarily be achieved. Therefore, like those described in Non-Patent Literatures 1 and 2, it is difficult to apply both of the methods described in Patent Literatures 1 and 3 for the purpose of obtaining high judging efficiency.

According to the technique described in Patent Literature 2, two or more cameras are required, which increases the cost of equipment for the system.

If the accurate measurement of the distance obtained by using the stereo vision method is low, it is difficult to appropriately narrow the size of the potential face; in order to obtain accurate measurement of the distances, the positions and environment for arranging the cameras have to be so severely restricted that the sites for installing the cameras will be limited.

An object of the present invention is to provide a person-judging device, method, and program that solve the above-mentioned problems and that are capable of accurately judging whether or not an object is a person by using a small amount of processing, even if an obstruction hides a portion of the object.

In order to achieve the above-mentioned object, the person-judging device according to the present invention includes:

an obstruction storage which stores information indicating an area of an obstruction which is extracted from an image based on a video signal from an external camera, the obstruction being extracted from the image;

head portion range calculation means which, when a portion of an object extracted from the image is hidden by the obstruction, assumes that a potential range of grounding points where the object touches a reference face on the image is the area of the obstruction which is stored in the obstruction storage, and which, based on the assumed range and the correlation between the height of a person and the size and position of the head portion that are previously provided, calculates the potential range of the head portion on the image by assuming that a portion farthest from the grounding points of the object is the head portion of the person; and head portion detection means that judges whether an area including a shape corresponding to the head portion exists in the range of the head portion calculated by the head portion range calculation means.

The person judging method according to the present invention is a person-judging method for judging whether or not an object appearing in an image based on a video signal from an external camera, including:

referencing an obstruction storage which stores information indicating an area of the obstruction on an image;

when a portion of the object extracted from the image is hidden by the obstruction, assuming that a potential range of grounding points where the object touches a reference face on the image is the area of an obstruction which is stored in the obstruction storage;

based on the assumed range and the correlation between the height of a person and the size and position of the head portion that are previously provided, calculating a potential range of the head portion on the image by assuming that a portion farthest from the grounding points of the object is the head portion of the person; and judging whether or not an area including a shape corresponding to the head portion exists in the range of the calculated head portion.

The program according to the present invention is a program used in a computer that judges whether or not an object appearing in an image based on a video signal from an external camera is a person, causing the computer to execute the processes of:

referencing an obstruction storage which stores information indicating an area of the obstruction on the image;

when a portion of the object extracted from the image is hidden by the obstruction, assuming that a potential range of grounding points where the object touches a reference face on the image is the area of the obstruction which is stored in the obstruction storage;

based on the assumed range and the correlation between the height of a person and the size and position of the head portion that are previously provided, calculating a potential range of the head portion on the image by assuming that a portion farthest from the grounding points of the object is the head portion of the person; and judging whether or not an area including a shape corresponding to the head portion exists in the range of the calculated head portion.

EXPLANATION OF REFERENCE NUMERALS 100 data processing device
110 hiding possibility judging means
120 grounding point range calculation means
130 position/size estimation means
140 human size conformance judging means
150 human size conformance judging means
160 head portion detection means
170 person-judging means
200 storage device
210 obstruction storage
220 camera parameter storage
230 head portion detection parameter storage

BEST MODE FOR CARRYING OUT THE INVENTION

Now, exemplary embodiments of the present invention will be described with reference to the drawings.

(First Exemplary Embodiment)

Figure 1:
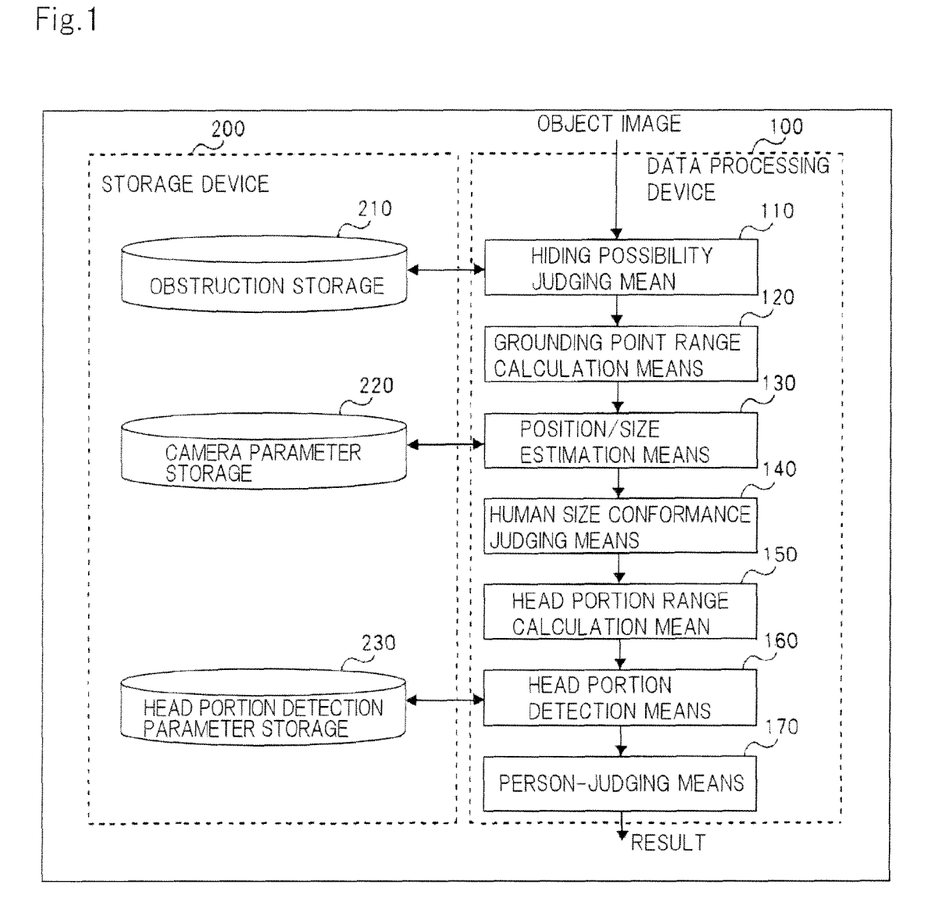
FIG. 1 is a block diagram showing a configuration of a person-judging device, a first exemplary embodiment of the present invention.

FIG. 1 is a block diagram showing a configuration of a person-judging device, a first exemplary embodiment of the present invention. Referring to FIG. 1, the person-judging device, which is for judging whether or not an object is a person when an image based on a video signal supplied from an external camera contains an object other than a preset obstruction, has a main part including data processing device 100 and storage device 200. An external camera may be a surveillance camera, for example.

Storage device 200 includes obstruction storage 210, camera parameter storage 220, and head portion detection parameter storage 230.

Obstruction storage 210 stores an area of a preset obstruction (an obstruction that possibly hides a person or an object) on an image based on a video signal supplied from an external camera. Although it is preferable to hold information representing the shape of an obstruction on an image by the unit of pixel in obstruction storage 210, the information on an obstruction area may also be held in obstruction storage 210 as a combination of rectangular areas. The 'combination of rectangular areas' means that a combination of small blocks represents the shape of an obstruction.

Camera parameter storage 220 stores parameters for bidirectional conversion between the image coordinate system, i.e., the coordinate system on an image based on a video signal from an external camera, and the real world coordinate system, i.e., the coordinate system on a map. The parameters are calculated in advance (of operating the device). Specifically, the camera calibration technique described in Cited Document 1 'R. Y. Tsai, "A Versatile Camera Calibration Technique for High-Accuracy 3D Machine Vision Metrology Using Off-the-Shelf TV Cameras and Lenses", IEEE Journal of Robotics and Automation, Vol. RA-3, No. 4, pp. 323-344, 1987' is used to derive internal parameters and external parameters of a camera and the derived parameters are stored in camera parameter storage 220. The internal parameter includes information on the focal length and the like of the camera. The external parameter includes information on the position, posture and the like of the camera.

Since the above-mentioned camera calibration technique is a well-known technique, it will not be described in detail here. Although the person-judging device of the embodiment does not include the external camera as a component, the parameters describing the camera lens and the conditions of the installed camera calculated in advance and stored in camera parameter storage 220 enables the person-judging device to perform bidirectional conversion between points in the image coordinate system and corresponding points in the coordinate system on the map.

Head portion detection parameter storage 230 stores parameters for judging whether or not an image contains a 'head portion'. The embodiment does not limit the technique for judging whether or not a 'head portion' exists. A process of recognizing whether or not a 'head portion' exists may be repeatedly performed to search for a head portion by using, for example, the 'generalized learning vector quantization', a statistical pattern recognition technique described in Cited Document 2 'Atsushi Sato, "Character Recognition using Generalized Learning Vector Quantization", Technical Report of the Institute of Electronics, Information and Communication Engineers (IEICE), PRMU95-219, 1996'. In that case, parameters called "reference vector" are stored in head portion detection parameter storage 230.

According to the above 'generalized learning vector quantization', one or more reference vectors belonging to each of two categories of 'head' and 'non-head' are prepared. The distance between input data and the reference vector is calculated to classify the input data into the category to which the nearest reference vector belongs. Intuitively, the reference vectors are sets of vector which include vectors representing 'head' and vectors representing 'non-head'.

Data processing device 100, which is a computer system operated under the control of a program, includes hiding possibility judging means 110, grounding point range calculation means 120, position/size estimation means 130, human size conformance judging means 140, head portion range calculation means 150, head portion detection means 160 and person-judging means 170.

Data processing device 110 receives a video signal from an external camera, and judges whether or not the area of an object, which is to be judged based on whether it is a 'person' or a 'non-person', touches the area of an obstruction held in obstruction storage 210 on image coordinates of the image based on the video signal. When the area of the object touches the area of the obstruction, hiding possibility judging means 110 judges that the obstruction hides the object. When the area of the object does not touch the area of the obstruction, hiding possibility judging means 110 judges that the obstruction does not hide the object.

When it is apparent that the obstruction does not hide the object even if the object and the obstruction touch the image such as in the case where the object stands before the obstruction from the viewpoint of the external camera, hiding possibility judging means 110 judges that the obstruction does not hide the object. Since the area of the obstruction is known, the state where the object stands before the obstruction from the viewpoint of the external camera can be detected by detecting the state where the area of the object hides the area of the obstruction.

Any method may be used as the technique of extracting an object on an image. For example, an object on an image may be extracted based on the difference between an image at a certain time of day (background image) and the current image as described in Patent Literature 2.

Grounding point range calculation means 120 calculates a potential range of the grounding points where the object touches the reference face such as floor or the like (here, it is assumed to be ground), i.e., the points corresponding to the sole of a person when the object is a person, on the image coordinates by taking into account the obstruction. Grounding point range calculation means 120 also calculates a potential range of the points (portion) of the object that is farthest from the grounding points, i.e., the points corresponding to the parietal (hereinafter referred to as 'vertex') when the object is a person, on the image coordinates by taking into account the obstruction.

Position/size estimation means 130 calculates the potential position of the object on the coordinate system of the real world, i.e., the position of the object on the map coordinate system, and the size of the object from the two sets of points 'the grounding points' and 'the vertex' of the object on the image coordinate system. Since grounding point range calculation means 120 calculates the potential ranges of the two sets of points 'the grounding points' and 'the vertex' of the object, the results calculated by position/size estimation means 130 are the potential range and size of the object.

Human size conformance judging means 140 compares the size of the object on the real world coordinate system and the statistically potential size of a human being to judge whether the object has the potential size of a person. Since the result calculated by position/size estimation means 130 is the range of the potential size of an object, if the range of the potential size of an object overlaps the range of the statistically potential size of a person, the object is possibly a person.

Here, it is assumed that the range of the potential size of the object ranges from the lowest value to the highest value of the size (height) of the object calculated by the Tsai's technique described in Cited Document 1, for example, from 50 cm to 130 cm. On the other hand, it is assumed that the range of the statistically potential size of a person, for example a Japanese person (elementary school student), is from the height of 110 cm to 180 cm. Then, because the range from 110 cm to 130 cm overlaps, the object is possibly a person of the height within the range.

Head portion range calculation means 150 calculates the potential range of the object area on the image coordinates, the potential range of the head portion on the image coordinates which is obtained, by assuming that the object is a 'person' from, based on relationship between the positions and sizes of the human body and the human head portion, and the potential range of the size of the human head portion.

The potential range of the object area on the image coordinates comprises values calculated by position/size estimation means 130, which is the potential ranges of the position and the size of the object combined with the area of the obstruction adjacent to the object. Based on the object area, the maximum height of the object is calculated from the minimum height of the object. On the other hand, correlation between the human height and the size of the human head portion (ratio of the head portion size in the height and physical relationship between the head portion and the entire body) is medically within a certain range. Based on that, when the height of the person is known, the potential range of the head position can be calculated. Therefore, the potential ranges of the position and the size of the head can be narrowed down by assuming that the height of the object is the height of a human being.

Since the ranges of the position and the size of the head portion are dependent on the person's posture, the person's posture may be restricted according to the purpose of the present invention. If a video observing only a walking action or a standing posture of a person is used as the input to the person-judging device of the embodiment, the relationship of the position and the size between the entire body and the head portion of a walking person and the relationship of the position and the size between the entire body and the head portion of a standing person may be used as the restrictions.

Head portion detection means 160 judges whether a particular area in an image (area narrowed down by head portion range calculation means 150) contains a 'head portion' or not. A pattern recognition technique for performing statistical pattern recognition based on brightness information of the image, for example, may be used to detect the head portion in the particular area in the judgment. Since the present invention is for judging whether an object is a 'person' or a 'non-person', a technique that does not confirm the position of the head portion may be used.

Person judging means 170 judges whether or not the object shown in the area is a person in the case where head portion detection means 160 judges that the particular area (area narrowed down by head portion range calculation means 150) does not contain the 'head portion'. In making this judgment, a judgment may be made as to whether or not the object is a person by using the aspect ratio of the area of the object, or whether or not the object is a person may be directly judged by using a statistical pattern recognition technique based on the brightness information of the image, for example.

Now, the entire operation of the person-judging device of the embodiment will be described in detail.

In the description below, the assumption is made that the area of the object, which is to be judged as a 'person' or a 'non-person', is narrowed down as preprocessing for the image based on the video signal from the external camera. Specifically, information indicating the area of the object as the area on the image coordinates may be inputted in hiding possibility judging means 110, or information on the area of the object extracted from the image may be inputted in hiding possibility judging means 110. There is a possibility that the narrowed down area does, in fact, not contain an object. In this case, human size conformance judging means 140 judges that it is not a 'person'. Therefore, information that indicates that the area is likely to contain an object may be inputted in hiding possibility judging means 110 as information indicating the area of the object.

Figure 2:
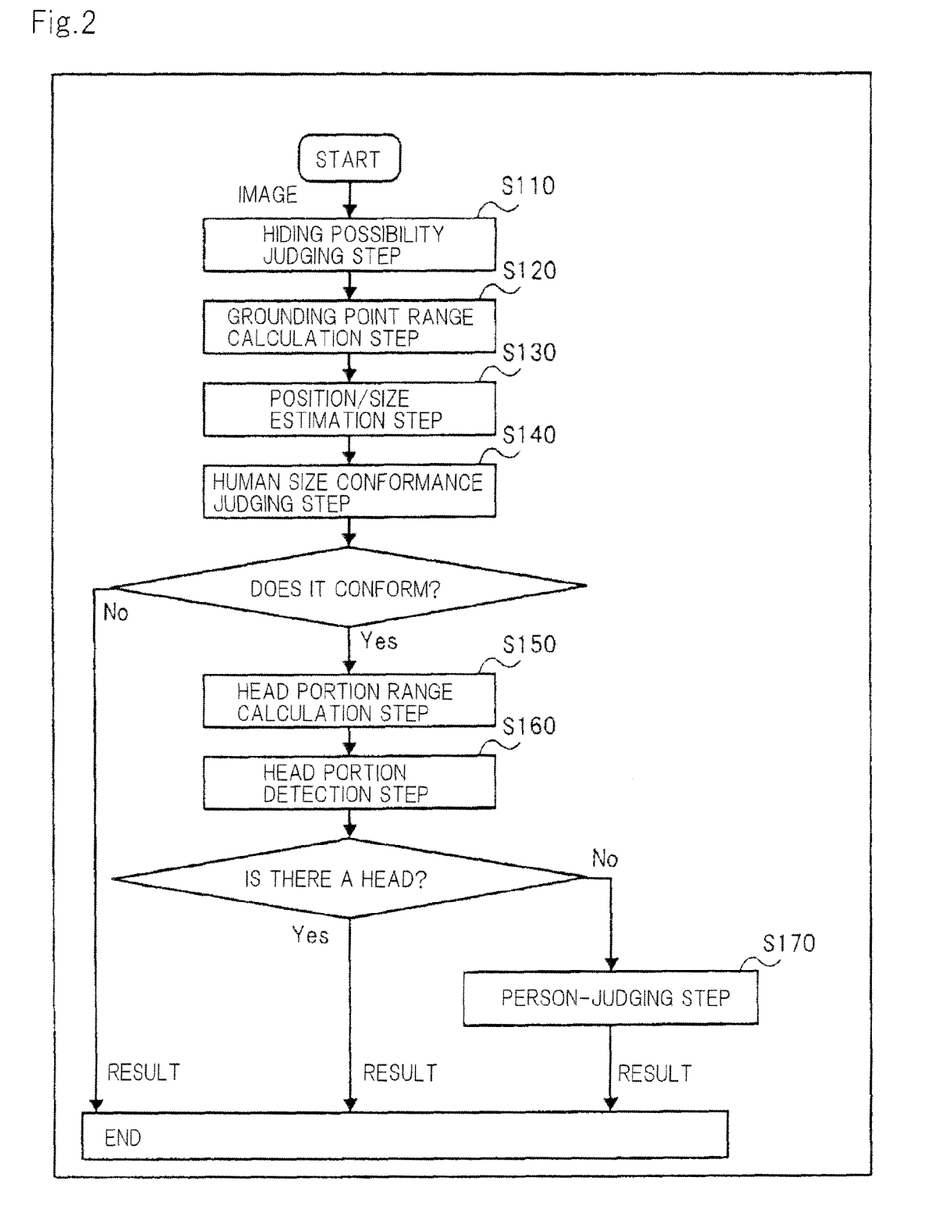
FIG. 2 is a flow chart for describing the entire operation of the person-judging device shown in FIG. 1.

FIG. 2 is a flow chart for describing the entire operation of the person-judging device shown in FIG. 1.

First, hiding possibility judging means 110 judges whether or not the area of an object touches the area of an obstruction on the image (step S110). Accordingly, whether or not the obstruction may hide the object is known.

Then, grounding point range calculation means 120 calculates the potential range of the grounding points where the object touches the ground (grounding points) and the potential range of the points of the object (vertex) farthest from the ground on the image coordinate system (S120). Here, grounding point range calculation means 120 calculates the potential range of the two sets of points by taking into account that the object is hidden by the obstruction. If it is judged that the object does not touch the obstruction in step S110 (if there is a possibility that the object is not hidden by the obstruction), the grounding points and vertex of the object are simply calculated.

Position/size estimation means 130 estimates the potential range of the position of the object on the map coordinates and the potential range of the size of the object from the respective ranges of the grounding points and vertex of the object on the image coordinate system which are calculated in step S120 (step S130). Conversion of the ranges from the image coordinate system into the real world coordinate system is performed based on the values held in camera parameter storage 220.

Human size conformance judging means 140 judges whether or not the range of the size of the object on the map coordinates calculated in step S130 is within an appropriate range of the size of a human being (step S140). If at least a portion of the potential range of the size of the object calculated in step S130 is within the statistically potential range of the size of a person, the object is possibly a 'person'; therefore, it is judged that the size does conform in step S140. On the other hand, if the potential range of the size of the object calculated in step S130 does not overlap the statistically potential range of the size of a person, the object is not possibly a 'person', therefore, it is judged that the size does not conform in step S140. If it is judged that the size does conform, the operation proceeds to the next step S150. If it is judged that the size does not conform, the operation ends.

If human size conformance judging means 140 judges that the size does conform, head portion range calculation means 150 assumes that the object is a person and calculates the potential ranges of the position and the size of the head portion of the person on the image coordinates (step S150).

Head portion detection means 160 judges whether or not the potential ranges of the position and the size of the head portion calculated in step S150 contain a 'head portion' with reference to parameters stored in head portion detection parameter storage 230 (step S160). The above-mentioned statistical pattern recognition technique, for example, may be used to judge whether or not there is a 'head portion'.

If it is judged that there is a 'head portion' in step S160, head portion detection means 160 outputs the judgment that the object is a 'person', and then, the operation ends. On the other hand, if it is judged that there is no 'head portion' in step S160 (or if a head portion cannot be successfully detected), person judging means 170 performs a person judging process (step S170). Any process for judging whether or not the object is a person can be applied to the person judging process. For example, a judgment may be made as to whether or not the object is a person by using the aspect ratio of the area of the object, or whether or not the object is a person may be directly judged by using a statistical pattern recognition technique based on the brightness information of the image, for example.

According to the person-judging device of the embodiment described above, the range of the position and the size of an object on the image coordinate system is calculated by taking into account the area of the object hidden by the obstruction, the calculated range is converted into the range on the map coordinates, and based on the range on the map coordinates, whether or not the object is a person is judged. Since the judgment process for determining whether or not there is a 'head portion' is performed only in the case where there is a possibility that the object is a person, the amount of processing can be reduced.

The ranges of the position and the size of the object on the image coordinate system are narrowed down by taking into account the area of the object hidden by the obstruction, and the judgment process for determining whether or not there is a 'head portion' is performed on the narrowed down range. That reduces the amount of processing and whether or not there is a 'head portion' can be judged with high-performance. In that manner, the embodiment can judge whether the object is a 'person' or a 'non-person' with a low amount for processing and high-performance even if a portion other than the head portion is hidden.

Embodiment

Now, the person-judging device shown in FIG. 1 will be described in detail with specific conditions.

The embodiment will be described in the case where the head portion appears in the upward direction and the feet appear in the downward direction of the image in the case where the upward direction of the image coordinate system is the height direction on the coordinate system of the real world, i.e., in the case where the person stands on the floor.

It is assumed that an obstruction that possibly shields the object is only objects such as a table or an object in the shape of a box or board put on the floor. According to the condition, there is a case where both of the grounding points and the vertex of the person are shielded by the obstruction and a case where only the grounding points are shielded by the obstruction. If both the grounding points and the vertex are shielded, the area of the object on the image cannot be detected in principle. Therefore, the grounding points are the only part where the shielding should be, in fact, considered.

Now, the operation of judging whether or not an object detected from an image is a person will be described in detail.

Data inputted to hiding possibility judging means 110 includes image data from an external camera and rectangular coordinate values indicating the area of the object. Obstruction storage 210 stores information representing the area of the obstruction on the image as a set of small rectangles in advance. When the information on the obstruction is stored into obstruction storage 210, the image data obtained from the external camera is manually stored. If the camera for capturing images is fixed, the stored obstruction information can be used as is also for an image captured at another time of day. The input workload in the case where the area of the obstruction is represented as a set of small rectangles is smaller than the input workload in the case where information on the obstruction area is input by the unit of pixel.

The parameters for bidirectional conversion between the camera image coordinate system and the real world coordinate system are stored in camera parameter storage 220. The parameters are calculated in advance by using the camera calibration technique described in the above-mentioned Cited Document 1.

The specific application of the camera calibration technique will be concisely described below.

The constant values of the camera lens (for example, focal length) are known. The coordinate values on the image that is practically captured by a camera and the corresponding coordinate values on the real world map (map coordinates) are manually calculated with respect to three or more points on the reference face for the real world coordinates, for example, the ground. Then, the camera parameters are calculated by applying these values to the formula described in the above-mentioned Cited Document 1.

As a technique of judging whether or not there is a 'head portion' by head portion detection means 160, the judgment process on whether it is a 'head portion' or a 'non-head portion' by the 'generalized learning vector quantization' described in the above-Cited Document 2 is performed on any partial area cut out from the area to be processed. For that purpose, reference vectors learned by the 'generalized learning vector quantization' are calculated as the parameters for judging whether a partial area of an image is a 'head portion' or a 'non-head portion', and stored in head portion detection parameter storage 230 in advance.

Now, the person judging operation will be described in detail below with reference to FIG. 1 and FIG. 2.

First, the operation corresponding to step S110 in FIG. 2 is performed. In step S110, it is judged whether or not the obstruction area touches a rectangular area of the object area in order to judge whether or not there is a possibility that an object is hidden.

In the embodiment, the upward direction of the image coordinate system is conditioned to be the height direction of the real world coordinate system, and the obstruction is conditioned to shield only the grounding points among the two sets of points of the object, the grounding points' and 'the vertex', as mentioned above. In addition, in step S120 on the next stage, a point other than the two sets of points such as 'the grounding points of the object' corresponding to the lower end of the object on the image and 'the vertex' corresponding to the upper end of the object on the image are not needed. Therefore, the process in step S110 can be simplified.

Specifically, in step S110, it is only necessary to judge whether or not the upper end of the obstruction area (rectangle) touches the lower end of the object area (rectangle). When the upper end of each of the small rectangles indicating the obstruction area is compared with the coordinate values of the lower end of the object area (rectangle) and if the coordinate values of the lower end of the object touch the upper end of each of the small rectangles on the image, the obstruction possibly hides a portion of the object.

Then, the operation corresponding to step S120 in FIG. 2 is performed.

Figure 3:
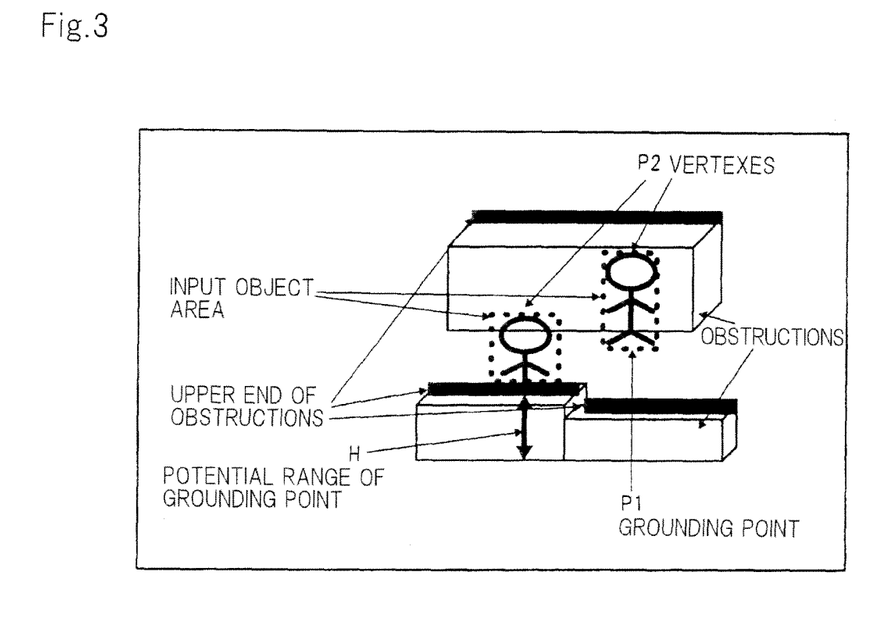
FIG. 3 is a schematic diagram for describing grounding points and vertexes of objects in an image, and potential ranges of the grounding points.

If it is judged that the obstruction does not hide an object in step S110, the lower end points of the object are decided as the grounding points and the upper end points of the object are decided as the vertex. In the example shown in FIG. 3, it is judged that the object shown right among the two objects on the image is not hidden by the obstruction in step S110. Therefore, it is decided that the lower end points P1 are the grounding points and the upper end points P2 are the vertex for this right-hand object.

On the other hand, if it is judged that the obstruction hides an object in step S110, there is a possibility that the grounding points of the object exist between the upper end and the lower end of the obstruction area. Therefore, the range between the upper end and the lower end of the obstruction area (denoted by H in FIG. 3) is estimated as the potential range of the grounding points of the object. The upper end points of the object are estimated as the farthest points (the vertex) from the ground. Those farthest points from the ground are the same as the points that are decided as the vertex when it is judged that the object is not hidden in step S110.

Then, the operation corresponding to step S130 in FIG. 2 is performed.

If it is judged that the grounding points and the vertex are decided to each be one point in step S120, the position of the object in the real world, i.e., the position of the object on the map coordinates, is obtained by converting the grounding points on the image coordinates into points on the real world coordinates. Also for the vertex of the object, the points are converted from the image coordinates into the map coordinates, and based on the vertex of the converted object and the position of the object on the map coordinates, the size of the object is obtained.

As a calculating technique by using the above-mentioned coordinate conversion, the calculating technique described in the above-mentioned Cited Document 1 can be used. More specifically, as the calculating technique, the calculating technique for obtaining the height of an object in the real world coordinates described in Cited Document 3 (Yuzo Ogawa, Hironobu Fujiyoshi, "Visual Tracking System by Master-Slaving", The ninth Symposium on Sensing via Image Information, 2003) (see formulae (8) and (9)) can be used.

On the other hand, if the grounding points are obtained not as one point but as a potential range in step S120, also the position of the object on the map coordinates corresponding to the grounding points needs to be obtained as a range. An approximate calculation as shown below is used for calculating the range.

First, the uppermost end points in the potential range of the grounding points of the object, i.e., the points that touch the obstruction converted into the map coordinates (Points A), and the lowermost end points in the potential range of the grounding points of the object, i.e., the lower end points of the obstruction converted into the map coordinates (Points B), are calculated respectively. The range between Points A and Points B may be estimated as the potential range of the object on the map coordinates. The size of the object in the real world also needs to be calculated, though, the calculation may be replaced with the estimation of the range of the size of the object as the range between the size of the object, calculated by assuming that the grounding points of the object are Points A, and the size of the object calculated by assuming that the grounding points of the object are Points B.

Then, the operation corresponding to step S140 in FIG. 2 is performed.

Whether or not the range of the practical size of the object calculated in step S130 overlaps the potential range of the size of a human being is judged. Specifically, the maximum and the minimum of the statistically potential height of a body of a human being may be decided as the potential range of a person. If a person appearing in the image can be narrowed down to an adult of Japanese nationality in the practical application of the present invention, the statistical values of that category may be used. It is a matter of course that the maximum and the minimum that can practically be ignored based on the statistical distribution of heights may be used instead of using the maximum and the minimum of the height as they are.

If it is judged that the object is possibly not a human being in step S140, it is judged that it is a 'non-person' and the operation ends.

Then, the operation corresponding to step S150 in FIG. 2 is performed and the potential range of the head portion on the image coordinates and the range of the head portion size are estimated. The potential position of the person's head portion and the range of the head portion size are calculated by assuming the height of the object calculated in step S140 as the height of a person. Specifically, if the person in the image is narrowed down to be walking or standing, the range of the head portion size can be calculated according to the distribution of the head portion size in the height of a person. It can be estimated that the head portion is within the range of the head portion size from the vertex.

Then, the operation corresponding to step S160 in FIG. 2 is performed.

Whether or not there is a 'head portion' is judged limitedly for the potential range of the head portion and the potential range of the head portion size estimated in step S150. A process of judging whether it is a 'head portion' or a 'non-head portion' by using the 'generalized learning vector quantization', a statistical pattern recognition method, is performed as a judgment technique on various partial areas that can be extracted from the area to be processed. The narrower the range that is to be judged, as to whether or not there is a 'head portion', the grater is the potential to prevent an increase in processing time.

If it is judged that there is a 'head portion' in the operation in step S160, it is judged that the object is a 'person' and the operation ends.

Then, the operation corresponding to step S170 in FIG. 2 is performed.

Any process for judging whether or not an object is a person can be allocated to step S170, and in this embodiment, the judgment using the aspect ratio of the area of the object to be judged is allocated. Since the object range on the image appears vertically long if it is a walking or standing person, it is judged that the object is a 'person' and the operation ends. If otherwise, it is judged that the object is a 'non-person' and the operation ends.

It is a matter of course if the processes up to step S160 are sufficiently effective in practice for judging that the object is a person, step S170 may be omitted.

Now, the advantages of the embodiment will be described.

Since the embodiment narrows down the range for the process of judging whether or not there is a 'head portion' while taking into account the possibility that an obstruction hides an object, it can accurately judge whether or not there is a 'head portion' without performing any wasteful calculation. Accordingly, the embodiment can accurately perform the process of judgment on whether the object is a 'person' or a 'non-person' with a small amount of processing even if a portion other than the head portion is hidden.

Although the height direction in the real world coordinate system is conditioned to be the upward direction on the image coordinate system in this embodiment, the height direction may be conditioned to be a direction other than the upward direction. In the latter case, the inputted image may be rotated by an angle made by the other direction to the upward direction. The present invention can provide the same advantage as that in the above process in judging whether or not an obstruction hides an object by rotating the image in the upward direction on the image coordinate system to be inputted. That is, the hiding-hided relationship between an object and an obstruction may be applied to the image that is rotated before input, or to the image by conditioning the axis of the image coordinate system from the vertex to the grounding points of the object.

Since the formula used by position/size estimation means 130 takes into account that rotation, the formula is available as is.

Figure 4:
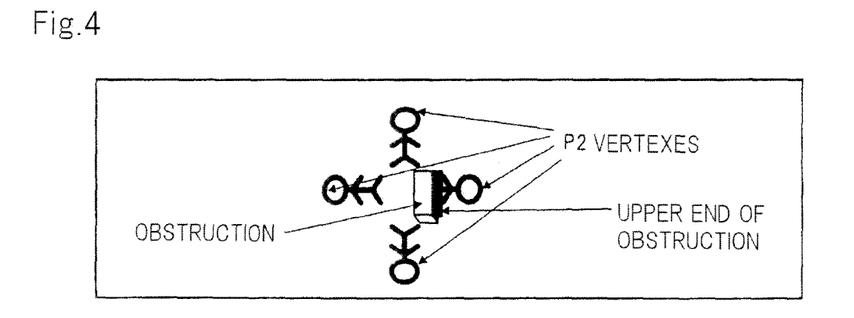
FIG. 4 is a schematic diagram showing a case where directions from vertexes of persons standing on a floor toward their grounding points converge on one point.

The height direction or the opposite direction to the height direction in the real world coordinate system may orient to a certain point in the image instead of orienting to a constant direction on the image coordinate system. More specifically, the directions from the vertexes to the grounding points of persons standing on a floor may respectively orient to a certain point as shown in FIG. 4. That kind of situation can be observed when a camera is aimed almost at the ground. In that case, the vertex direction and the grounding points direction of an object vary according to the position of the object on the image. In such a case, the hiding-hidden relationship between an object and an obstruction may be applied to the judgment by assuming that both the lower end direction of the object and the lower end direction of the obstruction orient to a point on the image.

The height directions of the objects in an image do not simply orient to a point if an image is largely distorted by the lens; in such a case, directions toward the upper ends and the lower ends of the objects in the entire image corresponding to the positions of the objects may be stored in memory separately from the image so that the processes are switched according to the directions.

The series of processes shown in FIG. 2 may be performed on each frame of a video signal supplied from an external camera. Alternatively, the series of processes shown in FIG. 2 may be performed on each frame from which an object is extracted on an image.

According to the present invention, whether an object contained in a moving image or a still image captured by camera is a 'person' or a 'non-person' can be judged with a small amount of processing and low-cost equipment even if the object is hidden by something to some extent. For that advantage, the present invention can be applied for purposes such as human surveillance in a room where there are a lot of obstructions such as a table and shelves.

Although the present invention has been described with reference to the embodiments, the present invention is not limited to the above-mentioned embodiments and examples. Various modifications that can be understood by those skilled in the art can be made to the configurations and operations of the present invention without departing from the spirit of the present invention.

For example, in the configuration shown in FIG. 1, the means may be partly integrated to simplify the configuration. For example, the person-judging device may include an obstruction storage which stores information indicating an area of an obstruction on an image based on a video signal from an external camera, the obstruction being extracted from the image; head portion range calculation means which, when a portion of an object extracted from the image is hidden by the obstruction, assumes that a potential range of grounding points where the object touches a reference face on the image is the area of an obstruction which is stored in the obstruction storage, and which, based on the assumed range and the correlation between the height of a person and the size and position of the head portion that are previously provided, calculates the potential range of the head portion on the image by assuming that a portion farthest from the grounding points of the object is the head portion of the person; and head portion detection means that judges whether an area having a shape corresponding to the head portion exists in the range of the head portion calculated by the head portion range calculation means.

According to the above-mentioned configuration, the range of an object is estimated by taking into account the range of an obstruction hiding the object and a potential range of the head portion is narrowed down within the assumed range. Therefore, the device can reduce the amount of processing in the judgment process of the head portion and also speed up the processing speed by the amount of the narrowed down range.

Since the device does not need to use multiple cameras, it can avoid the problems of higher cost and restrictions that result from the conditions required for installing cameras.

The person-judging device may further include: a camera parameter storage which holds a parameter that can perform coordinate transformation between a point on coordinates of the image and a point on coordinates of the real world; position/size estimation means that transforms a potential range of position and size of the object on coordinates of the image into a range of position and size on coordinates of the real world with reference to parameters held in the camera parameter storage, the potential range of position and size of the object on coordinates of the image being decided by the assumed range of the grounding points and the height of the portion from the reference face; and human size conformance judging means that judges whether or not the range of position and size of the object on coordinates of the real world which is transformed by the position/size estimation means is a potential human range based on statistical distribution of the human size and the head size on coordinates of the real world, wherein the head portion range calculation means may calculate a potential range where the head portion in the range of the object exists, when the human size conformance judging means judges that the range of position and size of the object is a potential human range.

The person-judging device may further include: hiding possibility judging means that judges whether or not the area of the object touches an upper end of the area of the obstruction in a direction perpendicular to the reference face on the coordinates of the image, and if the area touches the upper end, judges that the obstruction hides a portion of the object, wherein the area of the obstruction on the image is defined as a rectangular shaped area.

The person-judging device may further include: grounding point range calculation means that assumes that a range from a lower end to the upper end of the area of the obstruction in the direction perpendicular to the reference face on the coordinates of the image is the range of the grounding points, if the hiding possibility judging means judges that a portion of the object is hidden by the obstruction, wherein the head portion range calculation means may calculate the range of the head portion based on the range assumed by the grounding point range calculation means.

Further, the person-judging device may further include: person-judging means that, if the head portion detection means does not detect the shape corresponding to the head portion, judges whether or not the shape of the area of the object satisfies predetermined conditions indicating a shape of a person on the coordinates of the image, and if the conditions are satisfied, judges that the object is a person.

In the configuration shown in FIG. 1, a personal computer may be used as data processing device 100 and a semiconductor memory may be used as storage device 200. In that case, obstruction storage 210, camera parameter storage 220 and head portion detection parameter storage 230 may be regarded as a part of the semiconductor memory. Hiding possibility judging means 110, grounding point range calculation means 120, position/size estimation means 130, human size conformance judging means 140, head portion range calculation means 150, head portion detection means 160 and person-judging means 170 may be provided by a CPU of a personal computer performing a person judging program. The person-judging program is for causing a CPU to perform the series of processes shown in FIG. 2.

The above-mentioned embodiment converts potential ranges of the position and size of the object on the image coordinates into the ranges on the map coordinates, and judges whether or not the converted range is a potential range of a person based on statistical distribution of the size of a human body and the size of the head on the real world coordinates. Alternatively, the ranges of the size of a human body and the size of the head on the map coordinates based on statistical distribution may be converted into the ranges on the image coordinates so that whether or not the estimated size of the object on the image coordinates is a potential range of a person is judged based on the converted range.

The present invention may be applied to the whole field of surveillance cameras.

This application claims the benefit of priority based on JP2008-325447, filed on Dec. 22, 2008, which is entirely incorporated herein.

The invention claimed is:

1. A person judging device comprising:
an obstruction storage which stores information indicating an area of an obstruction which is extracted from an image based on a video signal from an external camera, the obstruction being extracted from the image;
a head portion range calculation unit which, when a portion of an object which is extracted from the image is hidden by the obstruction, assumes that a potential range of grounding points where the object touches a reference face on the image is the area of the obstruction which is stored in the obstruction storage, and which, based on the assumed range and the correlation between the height of a person and the size and position of the head portion that are previously provided, calculates the potential range of the head portion on the image by assuming that a portion farthest from the grounding points of the object is the head portion of the person; and
a head portion detection unit that judges whether an area including a shape corresponding to the head portion exists in the range of the head portion calculated by the head portion range calculation unit.

2. The person judging device according to claim 1, further comprising:
a camera parameter storage which holds a parameter that can perform coordinate transformation between a point on coordinates of the image and a point on coordinates of a real world;
a position/size estimation unit that transforms a potential range of position and size of the object on coordinates of the image into a range of position and size on coordinates of the real world with reference to parameters held in the camera parameter storage, the potential range of position and size of the object on coordinates of the image being decided by the assumed range of the grounding points and the height of the portion from the reference face; and a human size conformance judging unit that judges whether or not the range of position and size of the object on coordinates of the real world which is transformed by the position/size estimation unit is a potential human range based on statistical distribution of the human size and the head size on coordinates of the real world, wherein
the head portion range calculation unit calculates a potential range where the head portion in the range of the object exists, when the human size conformance judging unit judges that the range of position and size of the object is a potential human range.

3. The person-judging device according to claim 1, further comprising:
a hiding possibility judging unit that judges whether or not the area of the object touches an upper end of the area of the obstruction in a direction perpendicular to the reference face on the coordinates of the image, and if the area touches the upper end, judges that the obstruction hides a portion of the object, wherein
the area of the obstruction on the image is defined as a rectangular shaped area.

4. The person judging device according to claim 3, further comprising:
a grounding point range calculation unit that assumes that a range from a lower end to the upper end of the area of the obstruction in the direction perpendicular to the reference face on the coordinates of the image is the range of the grounding points, if the hiding possibility judging unit judges that a portion of the object is hidden by the obstruction, wherein
the head portion range calculation unit calculates the range of the head portion based on the range assumed by the grounding point range calculation unit.

5. The person-judging device according to claim 1, further comprising:
a person-judging unit that, if the head portion detection unit does not detect the shape corresponding to the head portion, judges whether or not the shape of the area of the object satisfies predetermined conditions indicating a shape of a person on the coordinates of the image, and if the conditions are satisfied, judges that the object is a person.

6. A person judging method for judging whether or not an object appearing in an image based on a video signal from an external camera is a person, comprising:
referencing an obstruction storage which stores information indicating an area of an obstruction on the image;
when a portion of the object extracted from the image is hidden by the obstruction, assuming that a potential range of grounding points where the object touches a reference face on the image is the area of the obstruction which is stored in the obstruction storage;
based on the assumed range and the correlation between the height of a person and the size and position of the head portion that are previously provided, calculating a potential range of the head portion on the image by assuming that a portion farthest from the grounding points of the object is the head portion of the person; and
judging whether or not an area including a shape corresponding to the head portion exists in the range of the calculated head portion.

7. A non-transitory recording medium recorded with a program used in a computer that judges whether or not an object appearing in an image based on a video signal from an external camera is a person, the program being for causing the computer to execute the processes of:

referencing an obstruction storage which stores information indicating an area of an obstruction on the image obstruction on the image;

when a portion of the object extracted from the image is hidden by the obstruction, assuming that a potential range of grounding points where the object touches a reference face on the image is the area of the obstruction which is stored in the obstruction storage;

based on the assumed range and the correlation between the height of a person and the size and position of the head portion that are previously provided, calculating a potential range of the head portion on the image by assuming that a portion farthest from the grounding points of the object is the head portion of the person; and judging whether or not an area including a shape corresponding to the head portion exists in the range of the calculated head portion.

* * * * *